US008013851B2

(12) United States Patent
Carter et al.

(10) Patent No.: US 8,013,851 B2
(45) Date of Patent: Sep. 6, 2011

(54) SYSTEM AND METHOD FOR LIGHTWEIGHT POLYGONAL TOPOLOGY REPRESENTATION

(75) Inventors: Michael B. Carter, Ames, IA (US);
Andreas Johannsen, Ames, IA (US);
Michael C. McCarty, Ames, IA (US);
Jeremy S. Bennett, Ames, IA (US); Bo Xu, Ames, IA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1024 days.

(21) Appl. No.: 11/837,236

(22) Filed: Aug. 10, 2007

(65) Prior Publication Data

US 2008/0036770 A1 Feb. 14, 2008

Related U.S. Application Data

(60) Provisional application No. 60/822,133, filed on Aug. 11, 2006.

(51) Int. Cl.
*G06T 15/00* (2011.01)
(52) U.S. Cl. .......................... 345/419; 345/428; 345/441
(58) Field of Classification Search .......................... None
See application file for complete search history.

(56) References Cited

U.S. PATENT DOCUMENTS

| | | | |
|---|---|---|---|
| 6,184,897 B1 | 2/2001 | Gueziec et al. | |
| 6,426,747 B1 * | 7/2002 | Hoppe et al. | 345/419 |
| 6,469,701 B1 * | 10/2002 | Gumhold | 345/419 |
| 7,098,916 B1 | 8/2006 | Khodakovsky et al. | |

OTHER PUBLICATIONS

Rossignac, "Edgebreaker: Connectivitiy compression for triangle meshes," 1999, vol. 5, No. 1, pp. 8, 10, and 15.*
Isenberg, "Triangle Strip Compression," 2001, Eurographics Association and Blackwell Publishers Ltd, vol. 20, p. 95.*
Shafae M et al: "DStrips: dynamic triangle strips for real-time mesh simplification and rendering" Computer Graphics and Applications, 2003. Proceedings. 11TH Pacific Conference on Oct. 8-10, 2003, Piscataway, NJ, USA, IEEE, Oct. 8, 2003, pp. 271-280, XP010662579 ISBN: 0-7695-2028-6 abstract p. 273, paragraph 3, p. 276, paragraph 4.4-p. 278, paragraph 5.2.
Lage M et al: "CHF: A Scalable Topological Data Structure for Tetrahedral Meshes" Computer Graphics and Image Processing, 2005. SIBGRAPI 2005. 18TH Brazilian Symposium on Natal, Rio Grande Do Norte, Brazil Oct. 9-12, 2005, Piscataway, NJ, USA, IEEE, Oct. 9, 2005, pp. 349-356, XP010897165 ISBN: 0-7695-2389-7 abstract p. 351, paragraph 4-p. 354, paragraph 4.3.
Mason Woo et al: "Open GL Programming Guide" Open GL Programming Guide, vol. 1.2, No. ED3, Oct. 1999, pp. I, II, 43-47, XP002472480 p. 43-p. 47.
Foley et al: "Computer Graphics: Principles and Practice passage" Computer Graphics. Principles and Practice, Reading, Addison Wesley, US, 1996, pp. 471-475, XP002472481 p. 471-p. 475.

(Continued)

*Primary Examiner* — Ulka Chauhan
*Assistant Examiner* — Andrew G Yang
(74) *Attorney, Agent, or Firm* — Michael J. Wallace, Jr.

(57) ABSTRACT

A system, method, and computer program for storing a polygonal topology, comprising representing a primitive with a plurality of vertices, internal half-edges and external half-edges; and storing said plurality of vertices in a vertex array and said plurality of external half-edges in a half-edge array, wherein said arrays are indexed and parallel to one another; whereby said primitive is re-created from said parallel array with said internal half-edges that are implicit from a primitive structure and appropriate means and computer-readable instructions.

8 Claims, 5 Drawing Sheets

OTHER PUBLICATIONS

Pierre Alliez, et al., "Progressive Compression for Lossless Transmission of Triangle Meshes" University of Southern California, 8 pages.

Martin Isenburg, et al., "Face Fixer: Compressing Polygon Meshes with Properties", UNC Technical Report TR-00-04; Mar. 2000 (appeared in SIGGRAPH 2000); University of North Carolina at Chapel Hill; pp. 1-8.

Pierre Alliez, et al., "Valence-Driven Connectivity Encoding for 3D Meshes", The Eurographics Association and Blackwell Publishers 2001, vol. 20, (2001) No. 3; 10 Pages.

* cited by examiner

SYSTEM AND METHOD FOR LIGHTWEIGHT POLYGONAL TOPOLOGY REPRESENTATION

PRIORITY OF APPLICATION

The present application claims priority of U.S. Provisional Application Ser. No. 60/822,133 filed Aug. 11, 2006, which is incorporated herein by reference.

TECHNICAL FIELD

The presently preferred embodiment of the innovations described herein relate generally to software applications. More specifically, the presently preferred embodiment relates to lightweight polygonal topology representation.

BACKGROUND

In computer graphic systems, a triangle strip, or tristrip, is a series of connected triangles where each triangle shares two vertices with the preceding triangle. The first three indices define a triangle and then each additional vertex defines another triangle. By convention the first triangle is right handed and then the handedness flips for each successive triangle. Tristrips and other similar primitives, e.g., trifans, are much faster to render using graphics libraries like OpenGL where a tristrip with n triangles is specified by n+2 vertices, that is, typically significantly less than the 3n vertices required to encode n triangles independently.

OpenGL is a graphics library utilized on many popular graphics cards and optimized on the respective GPUs, a graphics processing units that is a dedicated graphics rendering device. OpenGL has an immediate-mode rendering capability that utilizes indexed arrays that render utilizing vertices from unique vertex records. Further, GPUs typically have a vertex cache that maintains a cache of recent pre-transformed vertices where primitives are arranged so that repeated uses of a given vertex happens close to another.

What is needed is a system and method for storing primitive information in an indexed array that not only removes the number of redundant vertices but also reduces the array size to take advantage of graphics libraries and GPUs for faster rendering.

SUMMARY

To achieve the foregoing, and in accordance with the purpose of the presently preferred embodiment as broadly described herein, the present application provides a method for storing a polygonal topology, comprising representing a primitive with a plurality of vertices, internal half-edges and external half-edges; and storing said plurality of vertices in a vertex array and said plurality of external half-edges in a half-edge array, wherein said arrays are indexed and parallel to one another; whereby said primitive is re-created from said parallel array with said internal half-edges that are implicit from a primitive structure. The method, wherein said primitive is a tristrip. The method, wherein said primitive is one of a polygon, a linestrip, a quadstrip and a trifan.

Another advantage of the present application provides a method for using a stored polygonal topology, comprising: obtaining a first array that is indexed with and parallel to a second array; extracting a plurality of unique vertex data and a plurality of external half-edge data from said indexed arrays; and creating a primitive from said data. The method, wherein said primitive is a tristrip. The method, wherein said primitive is one of a polygon, a linestrip, a quadstrip and a trifan.

And another advantage of the present application provides a computer-program product tangibly embodied in a machine readable medium to perform a method for storing a polygonal topology, comprising instructions operable to cause a computer to representing a primitive with a plurality of vertices, internal half-edges and external half-edges; storing said plurality of vertices and said plurality of external half-edges in a parallel array; whereby said primitive is re-created from said parallel array with said internal half-edges that are implicit from a primitive structure.

And yet another advantage of the present application provides a data processing system having at least a processor and accessible memory to implement a method for storing a polygonal topology, comprising means for representing a primitive with a plurality of vertices, internal half-edges and external half-edges; means for storing said plurality of vertices and said plurality of external half-edges in a parallel array.

Another advantage of the presently preferred embodiment is to provide a computer-program product tangibly embodied in a machine readable medium to perform a computer-program product tangibly embodied in a machine readable medium to perform a method for.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 5:
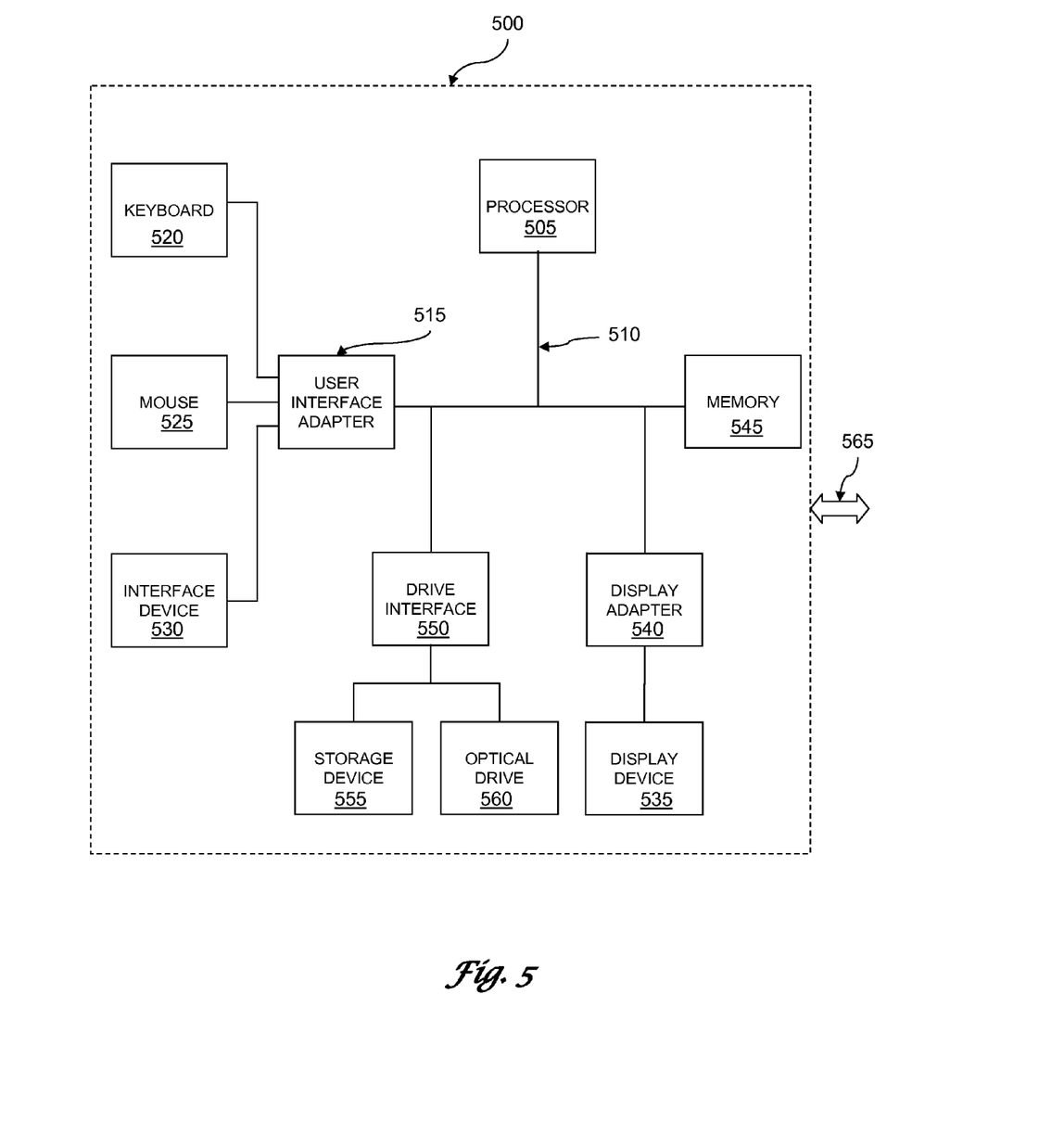
FIG. 5 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for managing error logs from distinct software applications across a computer network. Now therefore, in accordance with the presently preferred embodiment, an operating system executes on a computer, such as a general-purpose personal computer. FIG. 5 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 5, an exemplary system for implementing the presently preferred embodiment includes a general-purpose computing device in the form of a computer 500, such as a desktop or laptop computer, including a plurality of related peripheral devices (not depicted). The computer 500 includes a microprocessor 505 and a bus 510 employed to connect and enable communication between the microprocessor 505 and a plurality of components of the computer 500 in accordance with known techniques. The bus 510 may be any of several types of bus structures including a memory bus or memory controller, a peripheral bus, and a local bus using any of a variety of bus architectures. The computer 500 typically includes a user interface adapter 515, which connects the microprocessor 505 via the bus 510 to one or more interface devices, such as a keyboard 520, mouse 525, and/or other interface devices 530, which can be any user interface device, such as a touch sensitive screen, digitized pen entry pad, etc. The bus 510 also connects a display device 535, such as an LCD screen or monitor, to the microprocessor 505 via a display adapter 540. The bus 510 also connects the microprocessor 505 to a memory 545, which can include ROM, RAM, etc.

The computer 500 further includes a drive interface 550 that couples at least one storage device 555 and/or at least one optical drive 560 to the bus. The storage device 555 can include a hard disk drive, not shown, for reading and writing to a disk, a magnetic disk drive, not shown, for reading from or writing to a removable magnetic disk drive. Likewise the optical drive 560 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 500.

The computer 500 can communicate via a communications channel 565 with other computers or networks of computers. The computer 500 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 545 of the computer 500. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
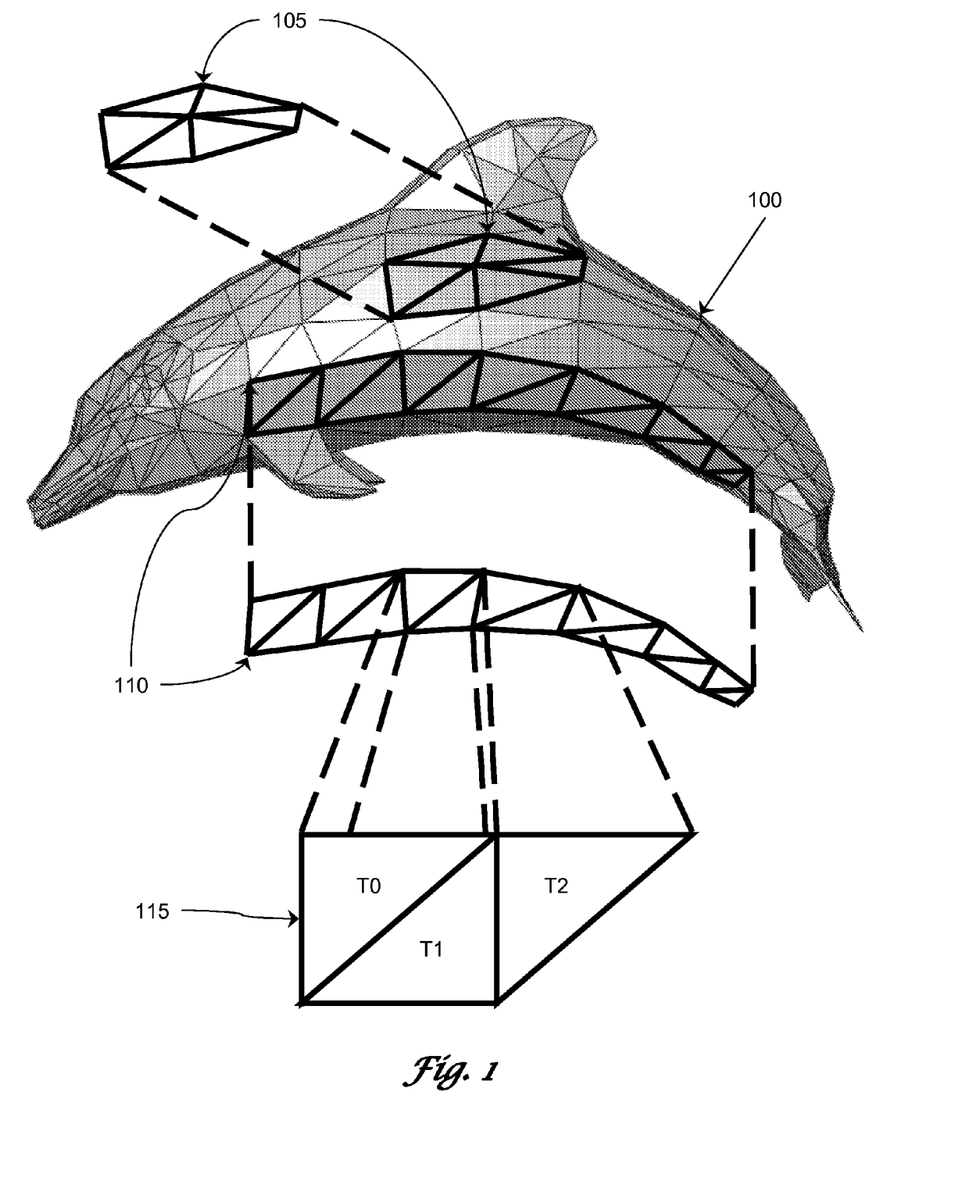
FIG. 1 is a triangle mesh representing a dolphin, wherein the triangle mesh has several tristrips

FIG. 1 is a triangle mesh representing a dolphin, wherein the triangle mesh has several tristrips. Referring to FIG. 1, a dolphin 100 is made-up of several primitives that can take the shape of triangle fans (trifans) 105 or triangle strips (tristrips) 110. In the trifan primitive, a new triangle is defined by a new vertex, the previous vertex and the first (or center) vertex that is common to all triangles in the "fan." In the tristrip primitive, a new triangle is defined by a new vertex and the previous two vertices that were added to the tristrip. Referring in greater detail to the tristrip primitive partially shown at 115. It can be seen that the tristrip has three triangles, labeled T0, T1, and T2, with topological entities called a vertex, a facet (face), and a half-edge.

Figure 2:
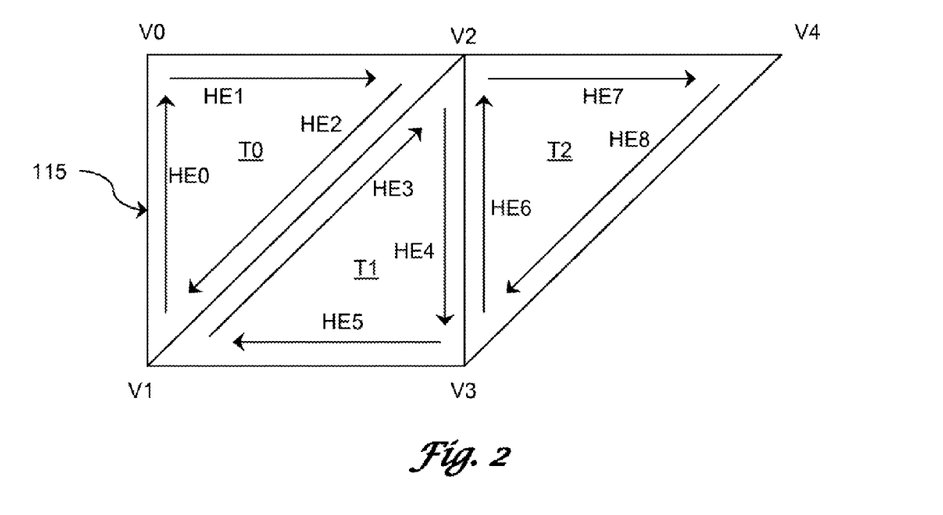
FIG. 2 is an illustration of polygonal mesh in a tristrip

FIG. 2 is an illustration of polygonal mesh in a tristrip. Referring to FIG. 2, with the three triangles, T0, T1, and T2, each triangle is incident upon three vertices. For example, T1 is incident upon topological vertices V1, V2, and V3. They are called topological vertices, rather than geometric vertices because the identity of vertex V1 is not dependent upon its location in space. Another way to say this is that triangles T0 and T1 are both incident upon vertex V1 no matter where it is in space. Normally, each triangle is thought of as having three distinct geometric vertices that may each lie at any point in space. In the topological way of thinking, these two triangles are adjacent not because they just happen to each have two vertices that lie at the same places in space as two vertices on the other triangle, but because the triangles are defined to lie on vertices V1 and V2, irrespective of their positions. T0 and T1 essentially share vertices V1 and V2.

Further to FIG. 2, a topological triangle is the three-sided entity that is incident upon three topological vertices. The topological triangle has no area, normal vector, or any other geometric attributes. Only when geometric vertices are associated with the topological vertices can one derive a concrete geometric triangle from the topological triangle.

Finally regarding FIG. 2, there is the topological half-edge, HE. Consider the topological edge between V1 and V2. If these topological vertices have associated geometric vertices, then topological edge V1-V2 defines a concrete geometric edge. It is sufficient to represent only the two so-called topological half-edges that make up the topological edge where this edge is essentially split down the middle and the two halves are shared by triangles T0 and T1. Triangle T0's half-edge is marked as HE2, while triangle T1's half-edge is marked as HE3. HE3 is known as the "opposite" half-edge of HE2; similarly HE2 is opposite HE3. Half-edge HE0 has no opposite half-edge, because it lies on a boundary edge. Note that all half-edge are directed. They have an originating vertex, and a target vertex. For example, HE2 is defined as going from V2 to V1. Note further that the three half-edges owned by any topological triangle always line up head-to-tail around the triangle in counter-clockwise order.

Referring now to both FIGS. 1 & 2, the tristrip 115 is an ordered set of N vertices that defines N–2 triangles. Consider that the 3 triangles T0, T1, and T2 are the tristrip represented by the 5 vertices {V0, V1, V2, V3, V4}. The triangle strip has fixed topology—the triangles always form the characteristic "zigzag" pattern. Notice that within this fixed topological domain, there are a number of internal half-edges (HE2, HE3, HE4, and HE6 in the figure) that need not be represented explicitly, but rather are implicit due to the tristrip structure. As the tristrip becomes longer, the fraction of these internal half-edges that need not be represented explicitly approaches ⅔. The topological elements of FIG. 2 can be represented in Table 1. Table 1 discloses the following: 1) due to the tristrip, only 5 vertex references must be stored; and 2) only five half-edge references need be stored (the four internal half-edges are implicit in the structure of the tristrip). The five half-edges that do need to be stored follow a strict pattern.

TABLE 1

| Triangle | Vertex | Half-Edge | Half-Edge Description |
|---|---|---|---|
|    | V0 | HE0 | First external edge |
| T0 | V1 | HE2 | Next triangle |
|    | V2 | HE1 | External edge |
|    | V1 | HE3 | Previous triangle |
| T1 | V2 | HE4 | Next triangle |
|    | V3 | HE5 | External edge |
|    | V2 | HE6 | Previous triangle |
| T2 | V3 | HE8 | Last external edge |
|    | V4 | HE7 | External edge |

Consider the fourth column of Table 1, the vertices are placed in the order that they are referenced from the tristrip, and that the corresponding half-edge from column three is the half-edge whose target vertex appears in column two. The first half-edge of the first triangle represents the beginning external edge of the tristrip. The first half-edge of all other triangles represents the edge leading to the previous triangle in the strip. The second half-edge of the last triangle represents the ending external edge of the tristrip. The second half-edge of all other triangles represents the edge leading to the next triangle in the strip. The third edge of every triangle represents an external edge in the strip. This regular structure makes it possible to efficiently know the precise nature of any half-edge of any triangle in a tristrip.

Figure 3:
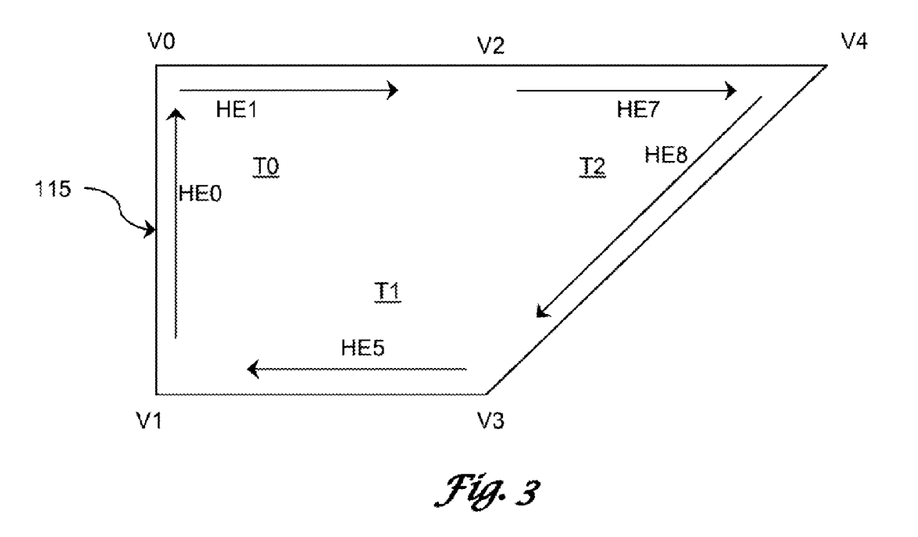
FIG. 3 is an illustration of polygonal mesh in a tristrip without displaying internal half-edges

FIG. 3 is an illustration of polygonal mesh in a tristrip without displaying internal half-edges. Understanding that there are N half-edges for a strip of N vertices, produces the data in Table 2. The entries in the first two columns of Table 2, when stored in arrays and indexed together, create a single parallel array that defines the given tristrip. That said, the entries in the first column of Table 2 are stored in a vertex array. The entries in the second column of Table 2 are stored in a half-edge array. Each element in the half-edge array lies parallel to the corresponding vertex element in the vertex array. And each element in the vertex array specifies the index in the half-edge array of its opposite half-edge. This single array of opposite half-edge references completes the toolbox of necessary functions to fully represent polygonal topology in a very efficient fashion by fully leveraging the information implicit within tristrips. By way of comparison to what an OpenMesh implementation would require, this way of representing topology is less then one tenth as large, assuming reasonable tristrip lengths. Even when representing individual unstripped triangles, this scheme is less than one third as large as OpenMesh.

TABLE 2

| Vertex | Half-Edge | Triangle Associations |
|---|---|---|
| V0 | HE0 |    |
| V1 | HE1 | T0 |
| V2 | HE5 | T1 |
| V3 | HE8 | T2 |
| V4 | HE7 |    |

Summary

Figure 4:
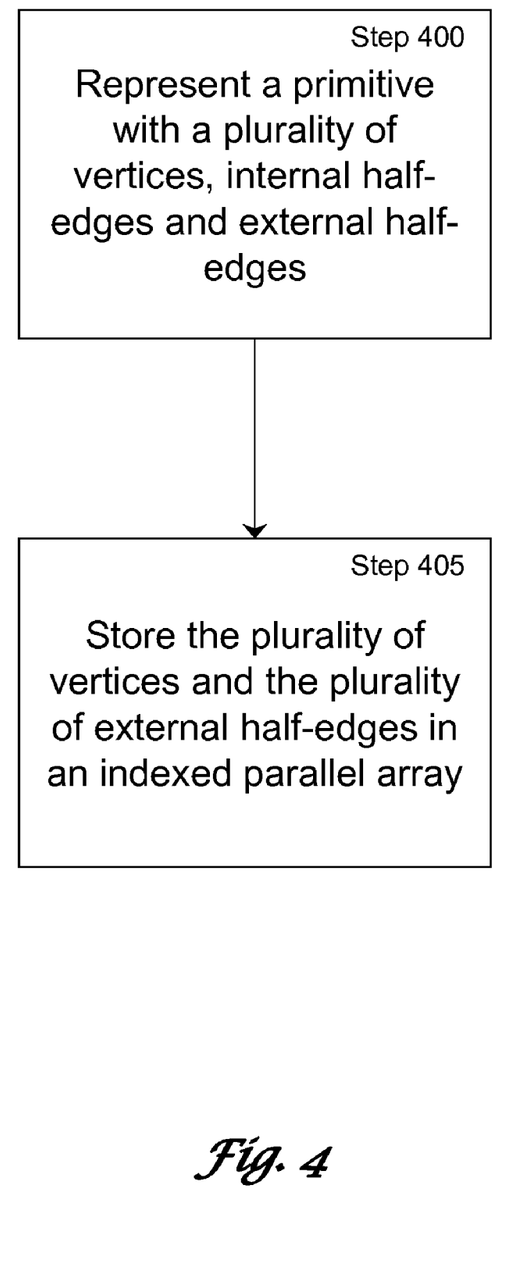
FIG. 4 is a technique for storing a polygonal topology.

Given the system disclosed above in the presently preferred embodiment, FIG. 4 is a technique for storing a polygonal topology. Referring further to FIG. 4, the presently preferred embodiment represents a primitive with a plurality of vertices, internal half-edges and external half-edges (Step 400). Next, the technique stores the plurality of vertices and the plurality of external half-edges in an indexed parallel array (Step 405). The primitive may be recreated from the parallel array with the internal half-edges that are implicit from a primitive structure.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits), including but not limited to GPUs and VPUs.

A number of embodiments have been described. It will be understood that various modifications may be made without departing from the spirit and scope of the presently preferred embodiment, such as replacing tristrips with other primitives like trifans, linestrips, and quadtrips, for example. Therefore, other implementations are within the scope of the following claims.

What is claimed is:

1. A method for storing a polygonal topology, comprising:
   representing a primitive in a computing device with a plurality of vertices, internal half-edges and external half-edges; and
   storing, in the computing device, said plurality of vertices in a vertex array and said plurality of external half-edges in a half-edge array, wherein said arrays are indexed and parallel to one another, without storing any of the internal half-edges,
   whereby said primitive is re-created from said parallel array with said internal half-edges that are implicit from a primitive structure.

2. The method of claim 1, wherein said primitive is a tristrip.

3. The method of claim 1, wherein said primitive is one of a polygon, a linestrip, a quadstrip and a trifan.

4. A method for using a stored polygonal topology, comprising:
   - obtaining, by a computing device, a first array that is indexed with and parallel to a second array;
   - extracting, by the computing device, a plurality of unique vertex data and a plurality of external half-edge data from said indexed arrays, without extracting internal half-edge data; and
   - creating a primitive from said plurality of unique vertex data and plurality of external half-edge data by the computing device.

5. The method of claim 4, wherein said primitive is a tristrip.

6. The method of claim 4, wherein said primitive is one of a polygon, a linestrip, a quadstrip and a trifan.

7. A tangible machine readable medium encoded with instructions that, when executed, cause a computer to:
   - represent a primitive with a plurality of vertices, internal half-edges and external half-edges; and
   - store said plurality of vertices and said plurality of external half-edges in a parallel array without storing any of the internal half-edges;
   - whereby said primitive is re-created from said parallel array with said internal half-edges that are implicit from a primitive structure.

8. A data processing system comprising:
   - a processor; and
   - an accessible memory; the data processing system configured to implement a method for storing a polygonal topology by performing the steps of
   - representing a primitive with a plurality of vertices, internal half-edges and external half-edges;
   - storing said plurality of vertices and said plurality of external half-edges in a parallel array, without storing any of the internal half-edges.

* * * * *